United States Patent
Montena

(10) Patent No.: US 9,419,388 B2
(45) Date of Patent: Aug. 16, 2016

(54) TRANSITION DEVICE FOR COAXIAL CABLES

(71) Applicant: PPC Broadband, Inc., East Syracuse, NY (US)

(72) Inventor: Noah P. Montena, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 14/725,146

(22) Filed: May 29, 2015

(65) Prior Publication Data

US 2015/0349473 A1    Dec. 3, 2015

Related U.S. Application Data

(60) Provisional application No. 62/004,951, filed on May 30, 2014.

(51) Int. Cl.
| | |
|---|---|
| *H01R 9/05* | (2006.01) |
| *H01R 24/38* | (2011.01) |
| *H02G 15/08* | (2006.01) |
| *H01R 103/00* | (2006.01) |
| *H02G 3/22* | (2006.01) |

(52) U.S. Cl.
CPC ............... *H01R 24/38* (2013.01); *H01R 9/05* (2013.01); *H02G 15/085* (2013.01); *H01R 2103/00* (2013.01); *H02G 3/22* (2013.01)

(58) Field of Classification Search
CPC ...... H01R 9/0521; H01R 9/05; H01R 9/0524; H01R 24/564; H01R 2103/00; H01R 13/59; H01R 13/5205; H01R 13/512; H01R 13/58
USPC ................... 439/584, 462, 394; 174/88 C, 89
See application file for complete search history.

(56) References Cited

U.S. PATENT DOCUMENTS

| | | | | | |
|---|---|---|---|---|---|
| 2,663,753 | A | * | 12/1953 | Bird | H01R 24/40 174/88 C |
| 3,325,752 | A | * | 6/1967 | Barker | H01P 5/085 333/260 |
| 3,340,495 | A | * | 9/1967 | Weinschel | H01P 1/045 439/578 |
| 3,426,311 | A | * | 2/1969 | Gifford | H01P 5/085 333/238 |
| 3,498,647 | A | * | 3/1970 | Schroder | F16L 19/086 174/75 C |
| 3,651,432 | A | * | 3/1972 | Henschen | H01P 5/08 333/21 R |
| 4,125,308 | A | * | 11/1978 | Schilling | H01P 5/085 333/260 |
| 5,154,636 | A | * | 10/1992 | Vaccaro | H01R 24/564 439/578 |
| 5,466,173 | A | * | 11/1995 | Down | H01R 9/0518 439/578 |
| 5,470,257 | A | * | 11/1995 | Szegda | H01R 9/05 439/389 |
| 5,518,420 | A | * | 5/1996 | Pitschi | H01R 24/564 439/578 |
| 5,525,076 | A | * | 6/1996 | Down | H01R 9/053 439/578 |

(Continued)

*Primary Examiner* — Abdullah Riyami
*Assistant Examiner* — Vladimir Imas
(74) *Attorney, Agent, or Firm* — Oliff PLC

(57) ABSTRACT

A cable transition device comprises a support sleeve configured to be inserted between a structural overwrap and a compliant outer jacket of a coaxial cable. The compliant outer jacket surrounds the signal-carrying conductors and extends beyond a terminal end of a stepped transition. The cable transition device includes a compression device configured to urge the structural overwrap against the support sleeve to establish an environmental seal therebetween and produce a load path from the overwrap to the support structure through one of the support sleeve and the compression device.

21 Claims, 11 Drawing Sheets

(56) References Cited

U.S. PATENT DOCUMENTS

| | | | | |
|---|---|---|---|---|
| 5,586,910 | A * | 12/1996 | Del Negro | H01R 9/0521 439/584 |
| 5,971,770 | A * | 10/1999 | Richmond | H01R 24/50 439/63 |
| 5,975,951 | A * | 11/1999 | Burris | H01R 13/5202 439/322 |
| 5,993,254 | A * | 11/1999 | Pitschi | H01R 9/0521 439/584 |
| 5,997,350 | A * | 12/1999 | Burris | H01R 9/0521 285/249 |
| 6,238,218 | B1 * | 5/2001 | Baffert | H01R 24/50 439/581 |
| 6,380,826 | B1 * | 4/2002 | Palinkas | H01R 24/42 333/175 |
| 6,663,424 | B1 * | 12/2003 | Wyse | H01P 5/085 333/260 |
| 6,733,336 | B1 * | 5/2004 | Montena | H01R 9/0524 439/578 |
| 6,850,129 | B2 * | 2/2005 | Lagerstedt | H01R 24/42 333/260 |
| 7,217,154 | B2 * | 5/2007 | Harwath | H01R 9/0518 439/578 |
| 7,311,554 | B1 * | 12/2007 | Jackson | H01R 9/0521 439/584 |
| 7,384,307 | B1 * | 6/2008 | Wang | H01R 9/0524 439/394 |
| 7,724,106 | B2 * | 5/2010 | Junemann | H01R 24/50 333/260 |
| 7,934,954 | B1 * | 5/2011 | Chawgo | H01R 9/0524 439/578 |
| 8,177,582 | B2 * | 5/2012 | Amidon | H01R 9/05 174/68.1 |
| 8,465,322 | B2 * | 6/2013 | Purdy | H01R 9/05 439/584 |
| 8,652,155 | B2 * | 2/2014 | Houser | A61B 17/320092 606/169 |
| 8,858,251 | B2 * | 10/2014 | Montena | H01R 9/05 439/322 |
| 8,876,553 | B2 * | 11/2014 | Lu | H01R 24/38 439/584 |
| 8,888,527 | B2 * | 11/2014 | Chastain | H01R 24/545 439/578 |
| 9,074,422 | B2 * | 7/2015 | Grubb | B23K 26/0093 |
| 9,130,281 | B2 * | 9/2015 | Phillips, Jr. | H01R 9/0524 |
| 9,136,629 | B2 * | 9/2015 | Holland | H01R 13/17 |
| 9,136,654 | B2 * | 9/2015 | Matzen | H01R 24/38 |
| 9,147,955 | B2 * | 9/2015 | Hanson | H01R 13/2421 |
| 9,147,963 | B2 * | 9/2015 | Balcer | H01R 9/0524 |
| 9,153,911 | B2 * | 10/2015 | Burris | H01R 13/6581 |
| 9,172,154 | B2 * | 10/2015 | Burris | H01R 9/05 |
| 9,190,744 | B2 * | 11/2015 | Burris | H01R 9/05 |
| 9,203,167 | B2 * | 12/2015 | Holliday | H01R 9/05 |
| 9,257,780 | B2 * | 2/2016 | Thomas | H01R 13/52 |
| 9,287,659 | B2 * | 3/2016 | Burris | H01R 13/622 |

* cited by examiner

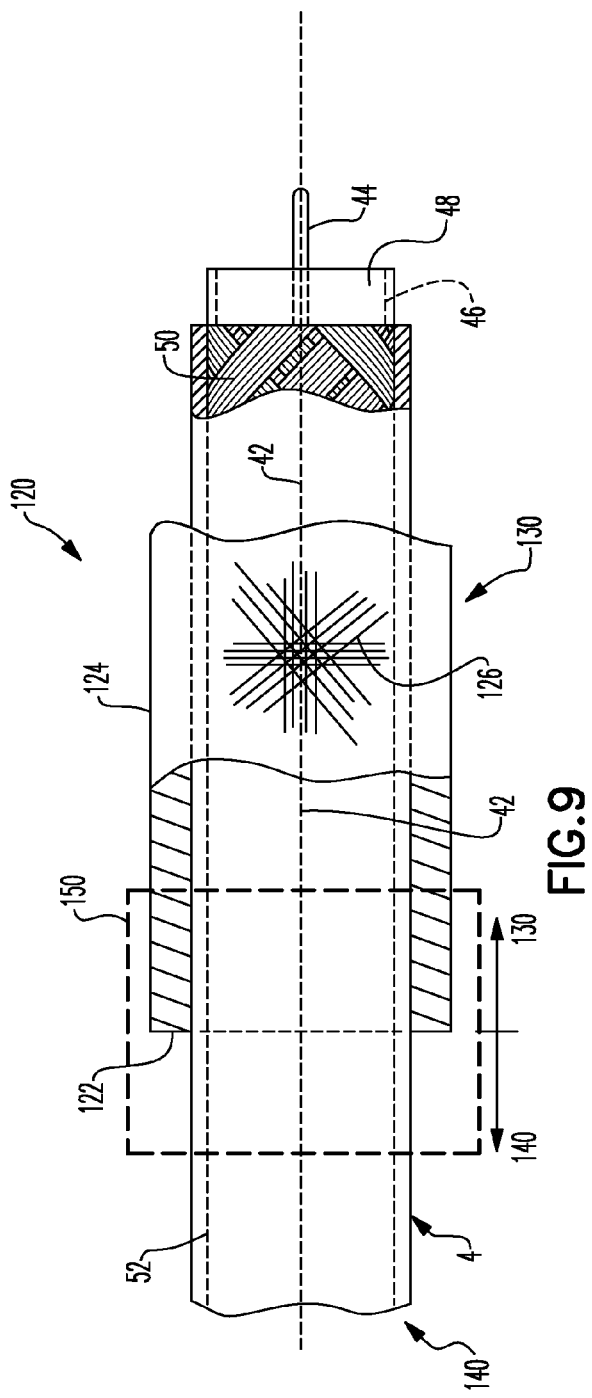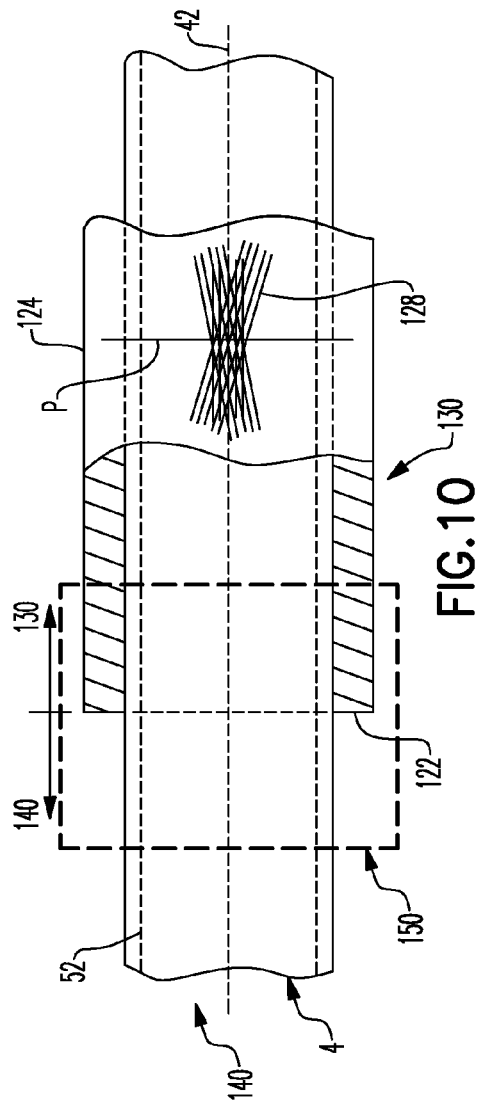

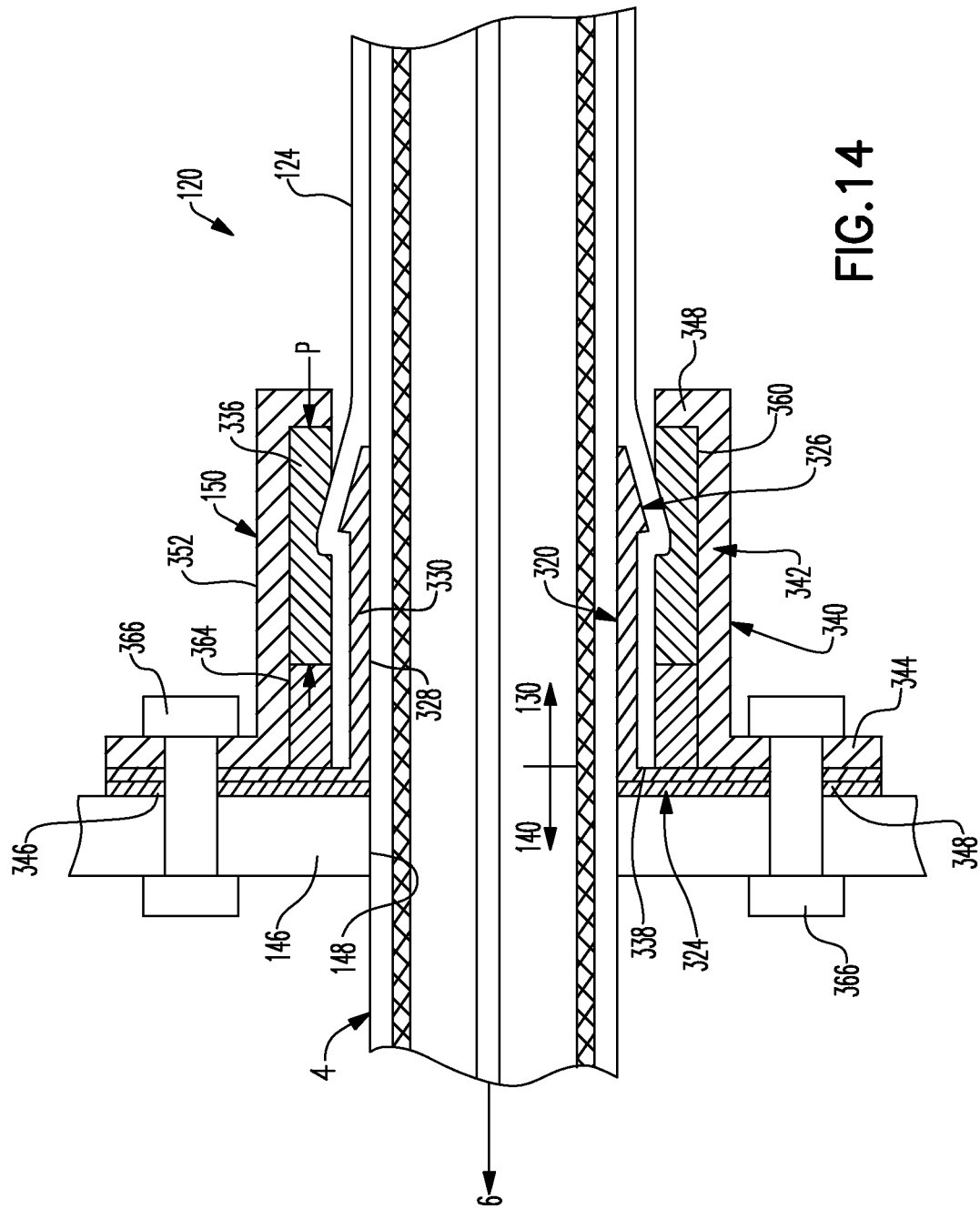

TRANSITION DEVICE FOR COAXIAL CABLES

CROSS-REFERENCE TO RELATED APPLICATION

This application is a Non-Provisional Patent Application, and claims the benefit and priority of U.S. Provisional Patent Application No. 62/004,951, filed on May 30, 2014. The entire content and disclosure of such application is hereby incorporated by reference.

BACKGROUND

Coaxial cable is known to be routed below ground, within conduits, or above ground, i.e., between utility poles and a mounting structure of the subscriber's home/office environment. When located under or below ground, a rigid, metal conduit often protects the cable from being damaged or severed by excavation equipment, e.g., heavy digging equipment such as a backhoe shovel. The cost of underground the cable can be significant, both in terms of the inventory requirements and the labor involved to bury the conduit/cable.

When located above ground, the coaxial cable extends between a support at each end and, as such, must be modified to address the environmental and structural differences influencing the coaxial cable. More specifically, the coaxial cable employed in aerial applications typically includes an anchor wire or "messenger" molded as part of the cable's jacket, extending along the cable's axis.

It is common for a service technician/installer to carry two types of cable, one for underground applications and the other for aerial applications. That is, the technician/installer typically carries cable without a messenger/anchor for underground applications and a cable with the messenger/anchor for aerial or above-ground applications. There is a significant burden of labor and cost related to storing, managing and installing these different types of cables.

Therefore, there is a need to overcome, or otherwise lessen the effects of, the disadvantages and shortcomings described above.

SUMMARY

A coaxial cable can be routed below ground to avoid damage due to inclement weather or above ground, between utility/support poles to minimize the cost of routing coaxial cable across long distances. The present disclosure describes a structurally augmented coaxial cable assembly useful in multiple environments/applications. In one embodiment, the structurally augmented coaxial cable assembly employs a single cable configuration common to multiple environments/applications, including, but not limited to, underground pathways and aerial or above-ground pathways. The structurally augmented coaxial cable assembly comprises a first cable section, a second cable section and a transition device disposed therebetween. The first cable section includes a signal-carrying coaxial cable disposed in combination with a structurally-augmented jacket, structurally-augmenting overwrap or structural overwrap. The first cable section may be employed below ground to protect the coaxial cable from damage or, above ground, to support/carry the weight of the coaxial cable between utility/telephone poles.

The second cable section generally extends beyond the first cable section and comprises the signal-carrying coaxial cable which is adapted for use with standard coaxial cable connectors, such as standard F-type connectors. More specifically, the structural overwrap is cut, stepped and stripped, to leave a sufficient length of signal-carrying coaxial cable to extend into a subscriber environment. A standard connector will then be secured to the end of the signal-carrying coaxial cable for coupling to an interface port.

In operation, the structurally-augmented jacket or structural overwrap protects the internal cable elements, reacts the weight of the coaxial cable as it spans utility poles or mounts, and/or prevents impact loads due to strikes from excavation equipment, falling debris, tree limbs, branches, etc., from damaging the cable. The coaxial cable assembly has, in one embodiment, a transition device useful to integrate with, seal and transfer loads from the structurally-augmented jacket or structural overwrap to the standing structure attached to the transition device.

In one embodiment, a structurally augmented cable comprises a first cable section defining a stepped transition, a second cable section integrated within the first section and extending beyond the stepped transition, and a transition element or device disposed between the first and second cable sections which enables the stepped transition. The first and second cable sections are axially separated by a transition element or device which seals the mating interface between the internal signal-carrying cable and a structurally-augmented jacket or structural overlap. The transition device also provides a load path from the structural overlap to a standing structure or mounting pole for carrying the weight of the coaxial cable. In one embodiment, the structurally-augmented jacket or structural overwrap comprises a fiber-reinforced flexible matrix binder which is separable from the primary jacket of the signal-carrying cable.

Features and advantages of the present disclosure are described in, and will be apparent from, the following Brief Description of the Drawings and Detailed Description.

BRIEF DESCRIPTION OF THE DRAWINGS

FIG. 9 is a schematic, broken away, and sectioned view of one embodiment of a structurally augmented coaxial cable assembly according to one embodiment of the disclosure including a first cable section, a second cable section and a transition device disposed therebetween wherein the first section includes a structural overwrap disposed over a signal-carrying cable and wherein the structural overwrap includes a fiber orientation yielding isotropic strength properties.

FIG. 10 is a schematic view, broken away, and sectioned view of one embodiment of the structurally augmented coaxial cable assembly wherein the structural overwrap includes a fiber orientation yielding quasi-isotropic strength properties.

FIG. 14 is a sectional view of another embodiment of the invention wherein the transition device provides a load path directly from an internal post to the anchor/support.

DETAILED DESCRIPTION

Network and Interfaces

Figure 1:
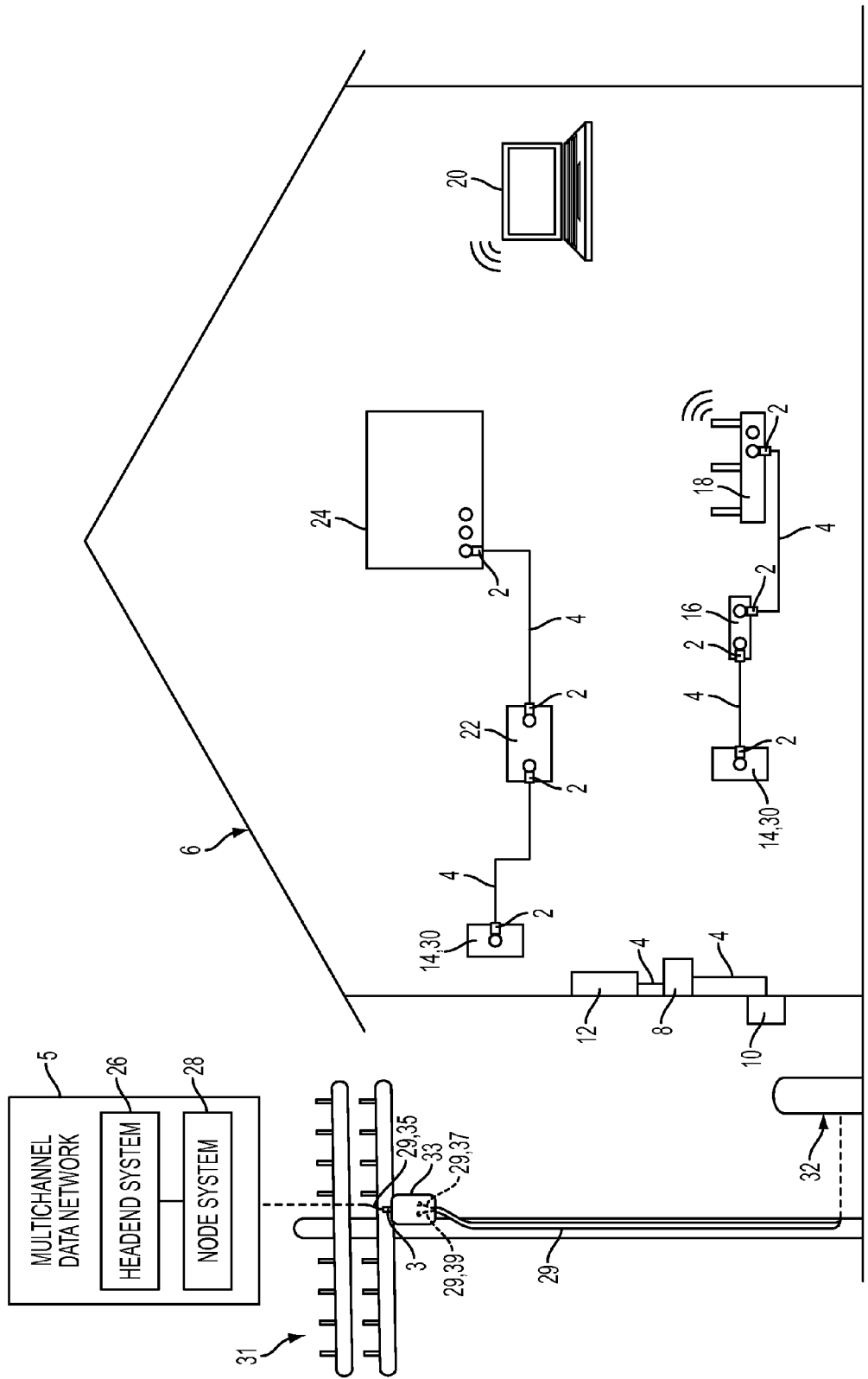
FIG. 1 is a schematic diagram illustrating an environment coupled to a multichannel data network.

Referring to FIG. 1, cable connectors 2 and 3 enable the exchange of data signals between a broadband network or multichannel data network 5, and various devices within a home, building, venue or other environment 6. For example, the environment's devices can include: (a) a point of entry ("PoE") filter 8 operatively coupled to an outdoor cable junction device 10; (b) one or more signal splitters within a service panel 12 which distributes the data service to interface ports 14 of various rooms or parts of the environment 6; (c) a modem 16 which modulates radio frequency ("RF") signals to generate digital signals to operate a wireless router 18; (d) an Internet accessible device, such as a mobile phone or computer 20, wirelessly coupled to the wireless router 18; and (e) a set-top unit 22 coupled to a television ("TV") 24. In one embodiment, the set-top unit 22, typically supplied by the data provider (e.g., the cable TV company), includes a TV tuner and a digital adapter for High Definition TV.

In one distribution method, the data service provider operates a headend facility or headend system 26 coupled to a plurality of optical node facilities or node systems, such as node system 28. The data service provider operates the node systems as well as the headend system 26. The headend system 26 multiplexes the TV channels, producing light beam pulses which travel through optical fiber trunklines. The optical fiber trunklines extend to optical node facilities in local communities, such as node system 28. The node system 28 translates the light pulse signals to RF electrical signals.

In one embodiment, a drop line coaxial cable or weather-protected or weatherized coaxial cable 29 is connected to the headend facility 26 or node facility 28 of the service provider. In the example shown, the weatherized coaxial cable 29 is routed to a standing structure, such as utility pole 31. A splitter or entry junction device 33 is mounted to, or hung from, the utility pole 31. In the illustrated example, the entry junction device 33 includes an input data port or input tap for receiving a hardline connector or male-type connector 3. The entry junction box device 33 also includes a plurality of output data ports within its weatherized housing. It should be appreciated that such a junction device can include any suitable number of input data ports and output data ports.

The end of the weatherized coaxial cable 35 is attached to a hardline connector or male-type connector 3. The ends of the weatherized coaxial cables 37 and 39 are each attached to one of the female-type connectors 2 described below. In this way, the connectors 2 and 3 electrically couple the cables 35, 37 and 39 to the junction device 33.

In one embodiment, the male-type connector 3 has a male shape which is insertable into the applicable female input tap or female input data port of the junction device 33. The two output ports of the junction device 33 are male-shaped, and the female-type connectors 2 receive, and connect to, such male-shaped output data ports.

In one embodiment, each input tap or input data port of the entry junction device 33 has an internally threaded wall configured to be threadably engaged with one of the male-type connectors 3. The network 5 is operable to distribute signals through the weatherized coaxial cable 35 to the junction device 33, and then through the male-type connector 3. The junction device 33 splits the signals to the two female-type connectors 2, weatherized by an entry box enclosure, to transmit the signals through the cables 37 and 39, down to the distribution box 32 described below.

In another distribution method, the data service provider operates a series of satellites. The service provider installs an outdoor antenna or satellite dish at the environment 6. The data service provider connects a coaxial cable to the satellite dish. The coaxial cable distributes the RF signals or channels of data into the environment 6.

In one embodiment, the multichannel data network 5 includes a telecommunications, cable/satellite TV ("CATV") network operable to process and distribute different RF signals or channels of signals for a variety of services, including, but not limited to, TV, Internet and voice communication by phone. For TV service, each unique radio frequency or channel is associated with a different TV channel. The set-top unit 22 converts the radio frequencies to a digital format for delivery to the TV. Through the data network 5, the service provider can distribute a variety of types of data, including, but not limited to, TV programs including on-demand videos, Internet service including wireless or WiFi Internet service, voice data distributed through digital phone service or Voice Over Internet Protocol (VoIP) phone service, Internet Protocol TV ("IPTV") data streams, multimedia content, audio data, music, radio and other types of data.

In one embodiment, the multichannel data network 5 is operatively coupled to a multimedia home entertainment network serving the environment 6. In one example, such multimedia home entertainment network is the Multimedia over Coax Alliance ("MoCA") network. The MoCA network increases the freedom of access to the data network 5 at various rooms and locations within the environment 6. The MoCA network, in one embodiment, operates on cables 4 within the environment 6 at frequencies in the range 1125 MHz to 1675 MHz. MoCA compatible devices can form a private network inside the environment 6.

In one embodiment, the MoCA network includes a plurality of network-connected devices, including, but not limited to: (a) passive devices, such as the PoE filter 8, internal filters, diplexers, traps, line conditioners and signal splitters; and (b)

active devices, such as amplifiers. The PoE filter 8 provides security against the unauthorized leakage of a user's signal or network service to an unauthorized party or non-serviced environment. Other devices, such as line conditioners, are operable to adjust the incoming signals for better quality of service. For example, if the signal levels sent to the set-top box 22 do not meet designated flatness requirements, a line conditioner can adjust the signal level to meet such requirement.

In one embodiment, the modem 16 includes a monitoring module. The monitoring module continuously or periodically monitors the signals within the MoCA network. Based on this monitoring, the modem 16 can report data or information back to the headend system 26. Depending upon the embodiment, the reported information can relate to network problems, device problems, service usage or other events.

At different points in the network 5, cables 4 and 29 can be located indoors, outdoors, underground, within conduits, above ground mounted to poles, on the sides of buildings and within enclosures of various types and configurations. Cables 29 and 4 can also be mounted to, or installed within, mobile environments, such as land, air and sea vehicles.

As described above, the data service provider uses coaxial cables 29 and 4 to distribute the data to the environment 6. The environment 6 has an array of coaxial cables 4 at different locations. The female-type connectors 2 are attachable to the coaxial cables 4. The cables 4, through use of the female-type connectors 2, are connectable to various communication interfaces within the environment 6, such as the male interface ports 14 illustrated in FIGS. 1-2. In the examples shown, male interface ports 14 are incorporated into: (a) a signal splitter within an outdoor cable service or distribution box 32 which distributes data service to multiple homes or environments 6 close to each other; (b) a signal splitter within the outdoor cable junction box or cable junction device 10 which distributes the data service into the environment 6; (c) the set-top unit 22; (d) the TV 24; (e) wall-mounted jacks, such as a wall plate; and (f) the router 18.

Figure 2:
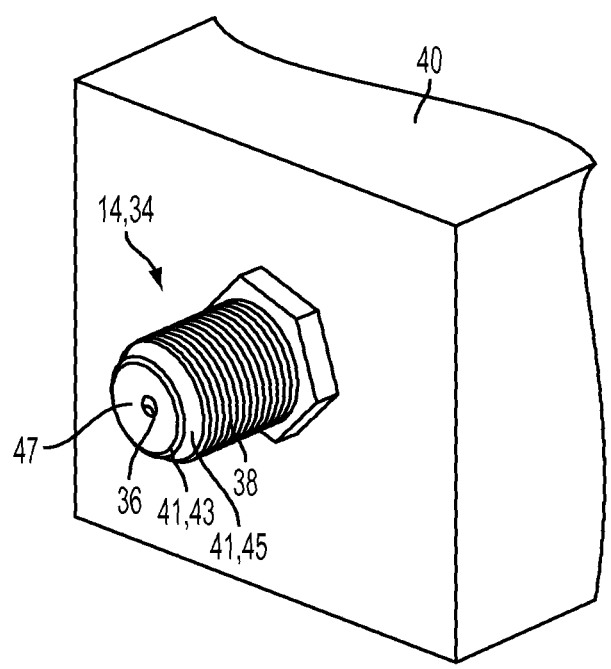
FIG. 2 is an isometric view of one embodiment of a male interface port which is configured to be operatively coupled to the multichannel data network.
Figure 4:
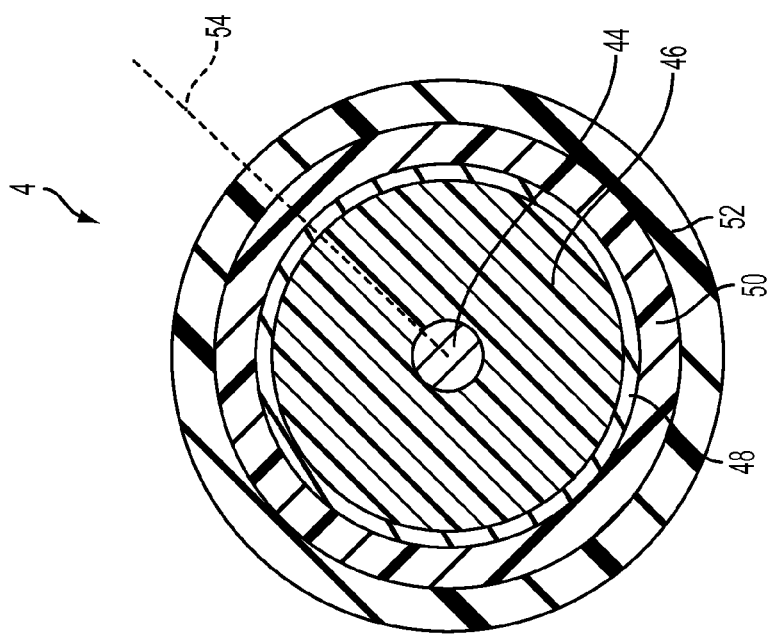
FIG. 4 is a cross-sectional view of the cable of FIG. 3, taken substantially along line 4-4.

In one embodiment, each of the male interface ports 14 includes a stud or male jack, such as the male stud 34 illustrated in FIG. 2. The male stud 34 has: (a) an inner, cylindrical wall 36 defining a central hole configured to receive an electrical contact, wire or conductor (not shown) positioned within the central hole; (b) a conductive, threaded outer surface 38; (c) a conical conductive region 41 having conductive contact sections 43 and 45; and (d) a dielectric or insulation material 47.

In one embodiment, male stud 34 is shaped and sized to be compatible with the F-type coaxial connection standard. It should be understood that, depending upon the embodiment, male stud 34 could have a smooth outer surface. The male stud 34 can be operatively coupled to, or incorporated into, a device 40 which can include, for example, a cable splitter of a distribution box 32, outdoor cable junction box 10 or service panel 12; a set-top unit 22; a TV 24; a wall plate; a modem 16; a router 18; or the junction device 33.

During installation, the installer couples a cable 4 to an interface port 14 by screwing or pushing the female-type connector 2 onto the male interface port 34. Once installed, the female-type connector 2 receives the male interface port 34. The female-type connector 2 establishes an electrical connection between the cable 4 and the electrical contact of the male interface port 34.

After installation, the connectors 2 often undergo various forces. For example, there may be tension in the cable 4 as it stretches from one device 40 to another device 40, imposing a steady, tensile load on the female-type connector 2. A user might occasionally move, pull or push on a cable 4 from time to time, causing forces on the female-type connector 2. Alternatively, a user might swivel or shift the position of a TV 24, causing bending loads on the female-type connector 2. As described below, the female-type connector 2 is structured to maintain a suitable level of electrical connectivity despite such forces.

Cable

Referring to FIGS. 3-6, the coaxial cable 4 extends along a cable axis or a longitudinal axis 42. In one embodiment, the cable 4 includes: (a) an elongated center conductor or inner conductor 44; (b) an elongated insulator 46 coaxially surrounding the inner conductor 44; (c) an elongated, conductive foil layer 48 coaxially surrounding the insulator 46; (d) an elongated outer conductor 50 coaxially surrounding the foil layer 48; and (e) an elongated sheath, sleeve or jacket 52 coaxially surrounding the outer conductor 50.

The inner conductor 44 is operable to carry data signals to and from the data network 5. Depending upon the embodiment, the inner conductor 44 can be a strand, a solid wire or a hollow, tubular wire. The inner conductor 44 is, in one embodiment, constructed of a conductive material suitable for data transmission, such as a metal or alloy including copper, including, but not limited, to copper-clad aluminum ("CCA"), copper-clad steel ("CCS") or silver-coated copper-clad steel ("SCCCS").

The insulator 46, in one embodiment, is a dielectric having a tubular shape. In one embodiment, the insulator 46 is radially compressible along a radius or radial line 54, and the insulator 46 is axially flexible along the longitudinal axis 42. Depending upon the embodiment, the insulator 46 can be a suitable polymer, such as polyethylene ("PE") or a fluoropolymer, in solid or foam form.

Figure 3:
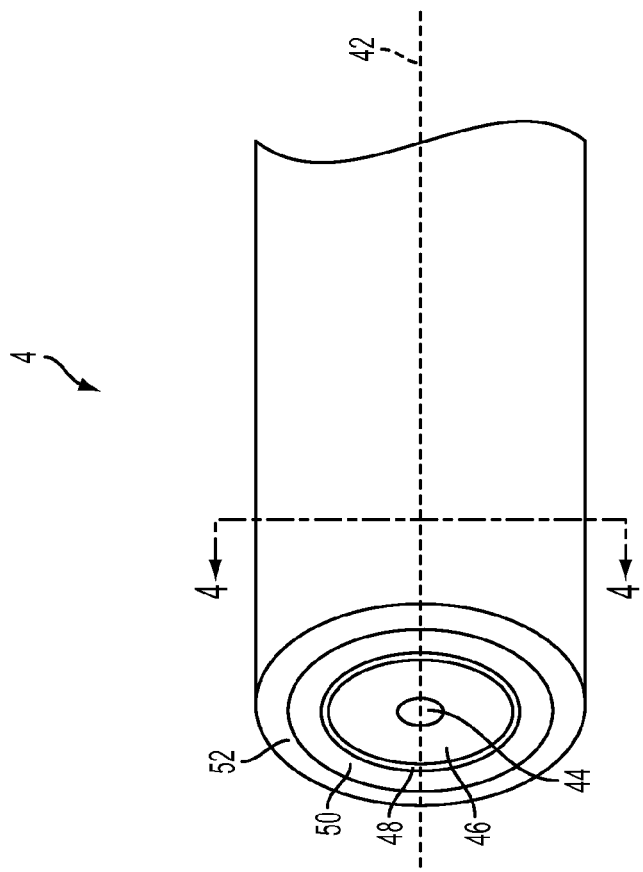
FIG. 3 is an isometric view of one embodiment of a coaxial cable which is configured to be operatively coupled to the multichannel data network.

In the embodiment illustrated in FIG. 3, the outer conductor 50 includes a conductive RF shield or electromagnetic radiation shield. In such embodiment, the outer conductor 50 includes a conductive screen, mesh or braid or otherwise has a perforated configuration defining a matrix, grid or array of openings. In one such embodiment, the braided outer conductor 50 has an aluminum material or a suitable combination of aluminum and polyester. Depending upon the embodiment, cable 4 can include multiple, overlapping layers of braided outer conductors 50, such as a dual-shield configuration, tri-shield configuration or quad-shield configuration.

In one embodiment, as described below, the female-type connector 2 electrically grounds the outer conductor 50 of the coaxial cable 4. When the inner conductor 44 and external electronic devices generate magnetic fields, the grounded outer conductor 50 sends the excess charges to ground. In this way, the outer conductor 50 cancels all, substantially all or a suitable amount of the potentially interfering magnetic fields. Therefore, there is less, or an insignificant, disruption of the data signals running through inner conductor 44. Also, there is less, or an insignificant, disruption of the operation of external electronic devices near the cable 4.

In such embodiment, the cable 4 has two electrical grounding paths. The first grounding path runs from the inner conductor 44 to ground. The second grounding path runs from the outer conductor 50 to ground.

The conductive foil layer 48, in one embodiment, is an additional, tubular conductor which provides additional shielding of the magnetic fields. In one embodiment, the foil layer 48 includes a flexible foil tape or laminate adhered to the insulator 46, assuming the tubular shape of the insulator 46. The combination of the foil layer 48 and the outer conductor 50 can suitably block undesirable radiation or signal noise from leaving the cable 4. Such combination can also suitably block undesirable radiation or signal noise from entering the cable 4. This can result in an additional decrease in disruption of data communications through the cable 4 as well as an additional decrease in interference with external devices, such as nearby cables and components of other operating electronic devices.

In one embodiment, the outer jacket 52 has a protective characteristic, guarding the cable's internal components from damage. The outer jacket 52 also has an electrical insulation characteristic. In one embodiment, the outer jacket 52 is compressible along the radial line 54 and is flexible along the longitudinal axis 42. The outer jacket 52 is constructed of a suitable, flexible material such as polyvinyl chloride (PVC) or rubber. In one embodiment, the outer jacket 52 has a lead-free formulation including black-colored PVC and a sunlight resistant additive or sunlight resistant chemical structure.

Figure 5:
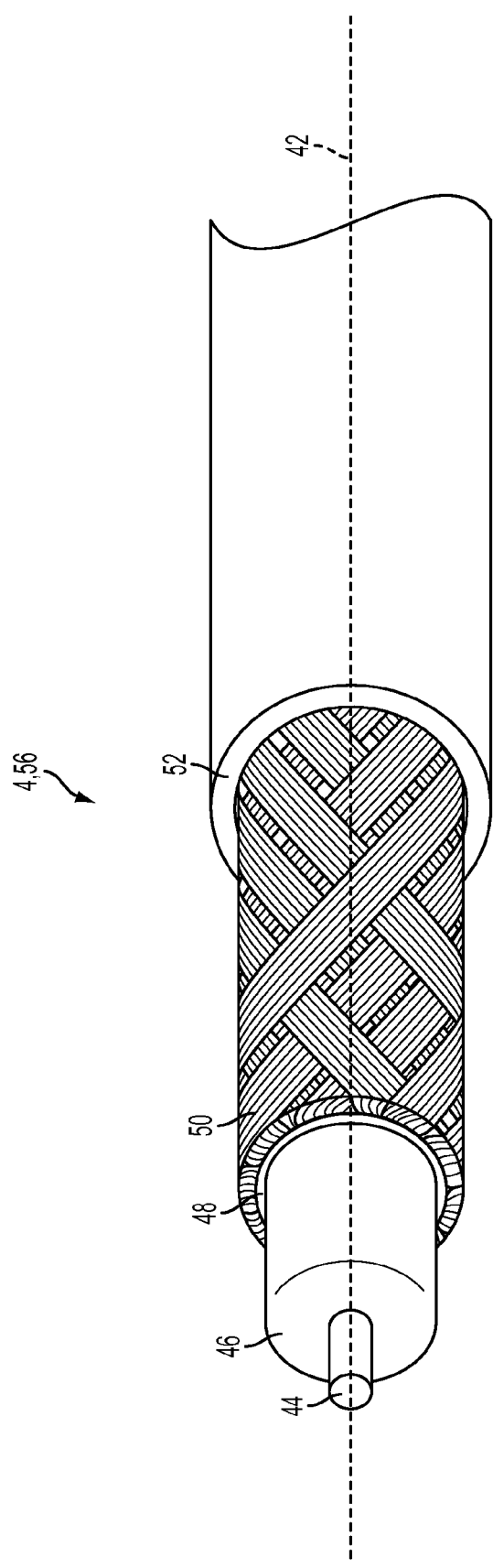
FIG. 5 is an isometric view of one embodiment of a coaxial cable which is configured to be operatively coupled to the multichannel data network, illustrating a three step shaped configuration of a prepared end of the coaxial cable.
Figure 6:
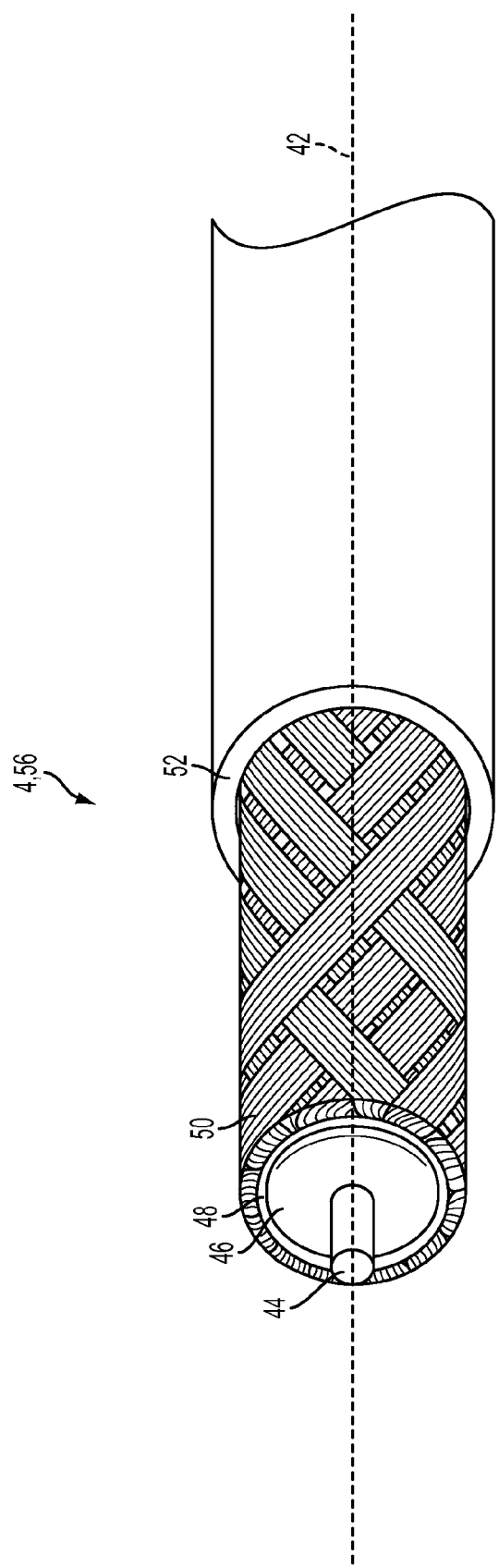
FIG. 6 is an isometric view of one embodiment of a coaxial cable which is configured to be operatively coupled to the multichannel data network, illustrating a two-step shaped configuration of a prepared end of the coaxial cable.

Referring to FIGS. 5-6, in one embodiment an installer or preparer prepares a terminal end 56 of the cable 4 so that it can be mechanically connected to the female-type connector 2. To do so, the preparer removes or strips away differently sized portions of the outer jacket 52, outer conductor 50, foil 48 and insulator 46 so as to expose the side walls of the outer jacket 52, outer conductor 50, foil layer 48 and insulator 46 in a stepped or staggered fashion. In the example shown in FIG. 5, the prepared end 56 has a three step-shaped configuration. In the example shown in FIG. 6, the prepared end 58 has a two step-shaped configuration. The preparer can use cable preparation pliers or a cable stripping tool to remove such portions of the cable 4. At this point, the cable 4 is ready to be connected to the female-type connector 2.

Figure 7:
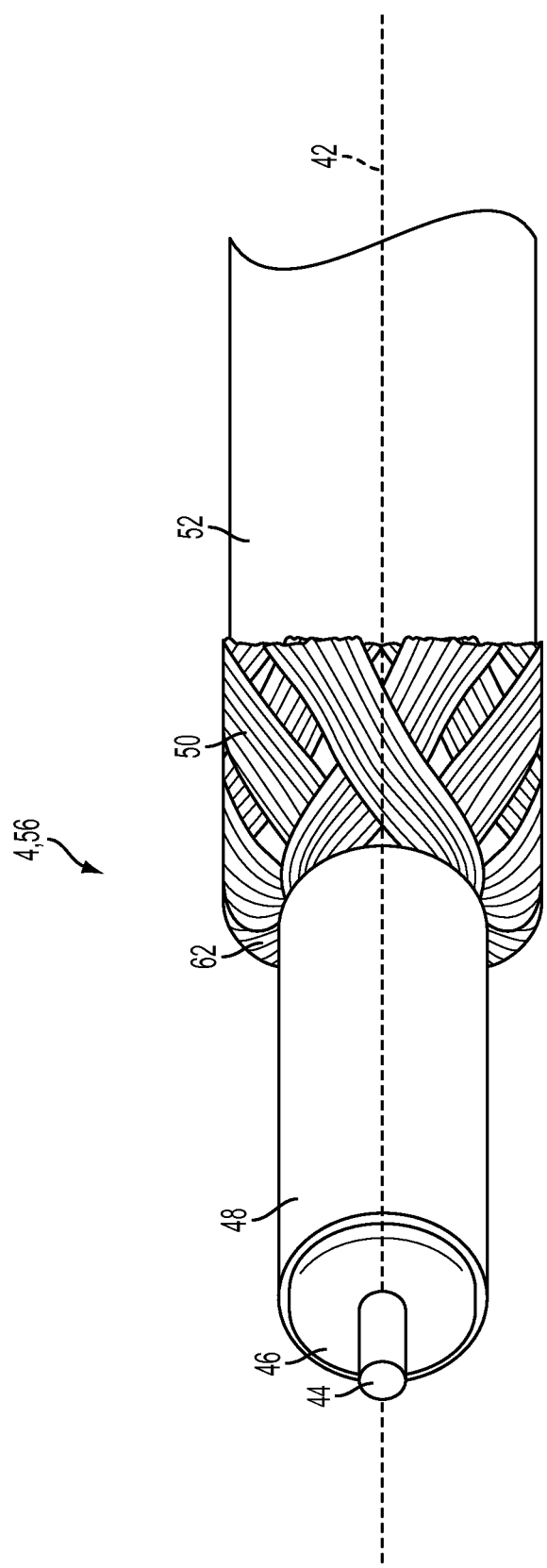
FIG. 7 is an isometric view of one embodiment of a coaxial cable which is configured to be operatively coupled to the multichannel data network, illustrating the folded-back, braided outer conductor of a prepared end of the coaxial cable.

In one embodiment illustrated in FIG. 7, the installer or preparer performs a folding process to prepare the cable 4 for connection to female-type connector 2. In the example illustrated, the preparer folds the braided outer conductor 50 backward onto the outer jacket 52. As a result, the folded section 60 is oriented inside out. The bend or fold 62 is adjacent to the foil layer 48 as shown. Certain embodiments of the female-type connector 2 include a tubular post. In such embodiments, this folding process can facilitate the insertion of such post in between the braided outer conductor 50 and the foil layer 48.

Depending upon the embodiment, the components of the cable 4 can be constructed of various materials which have some degree of elasticity or flexibility. The elasticity enables the cable 4 to flex or bend in accordance with broadband communications standards, installation methods or installation equipment. Also, the radial thicknesses of the cable 4, the inner conductor 44, the insulator 46, the conductive foil layer 48, the outer conductor 50 and the outer jacket 52 can vary based upon parameters corresponding to broadband communication standards or installation equipment.

Figure 8:
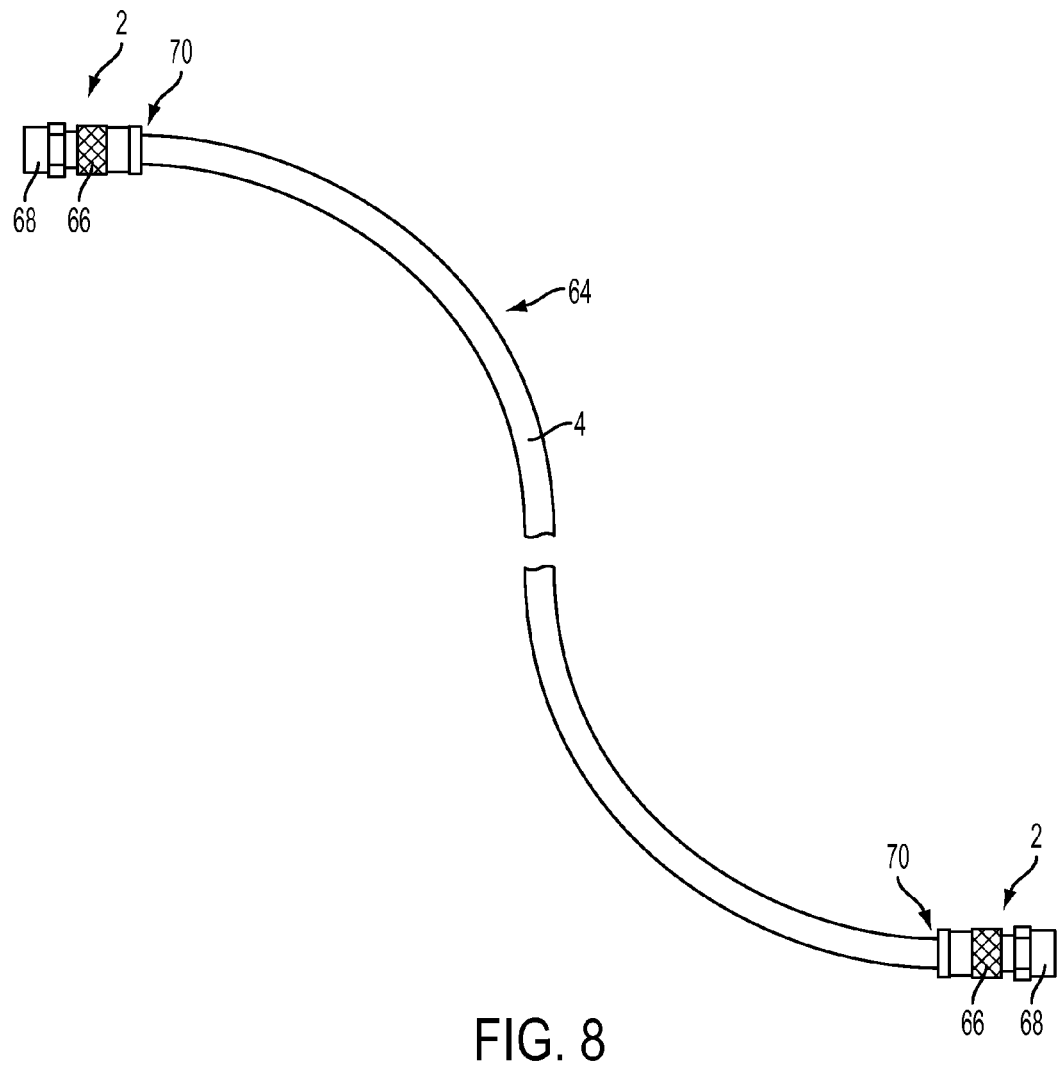
FIG. 8 is a top view of one embodiment of a coaxial cable jumper or cable assembly which is configured to be operatively coupled to the multichannel data network.

In one embodiment illustrated in FIG. 8, a cable jumper or cable assembly 64 includes a combination of the female-type connector 2 and the cable 4 attached to the female-type connector 2. In this embodiment, the female-type connector 2 includes: (a) a connector body or connector housing 66; and (b) a fastener or coupler 68, such as a threaded nut, which is rotatably coupled to the connector housing 66. The cable assembly 64 has, in one embodiment, connectors 2 on both of its ends 70. Preassembled cable jumpers or cable assemblies 64 can facilitate the installation of cables 4 for various purposes.

In one embodiment the weatherized coaxial cable 29, illustrated in FIG. 1, has the same structure, configuration and components as coaxial cable 4 except that the weatherized coaxial cable 29 includes additional weather protective and durability enhancement characteristics. These characteristics enable the weatherized coaxial cable 29 to withstand greater forces and degradation factors caused by outdoor exposure to weather.

Structurally Augmented Coaxial Cable Assembly

From right to left in FIG. 9, a coaxial cable assembly 120 includes a first cable section 130, a second cable section 140 extending beyond an edge 122 of the first cable section 130, and a transition device 150 disposed between the first and second cable sections 130, 140. The cable sections 130 and 140 include continuously connected, unitary segments, such as the inner conductor 42, outer conductor 50 and primary jacket 52. The transition device 150 is shown in dashed lines to depict its general position relative to the first and second cable sections 130, 140. The first cable section 130 comprises a signal-carrying coaxial cable 4 having a primary jacket 52 and a structurally-augmented jacket or structural overwrap 124.

In one embodiment, the structurally-augmented jacket or structural overwrap 124 has an axial load bearing enhancement or enhancer, and the structural overwrap 124 also has as a puncture protector or puncture protection characteristic or shield characteristic. The axial load bearing enhancer enables the overwrap 124 to withstand or bear an axial force which does not cause failure in the overwrap 124 but which would cause failure in the primary jacket 52. In one embodiment, the structural overwrap 124 has a high-strain, high tensile strength, fiber-reinforced, flexible matrix composite. In the described embodiment, the structural overwrap 124 may be formed directly over the primary jacket 52 of the signal-carrying cable 4, i.e., using the cable 4 as a forming mandrel. In one embodiment, the structurally-augmented jacket or structural overwrap 124 has reinforcing fibers which are braided or spirally wound at a desired fiber orientation to provide certain isotropic, anisotropic and quasi-isotropic strength properties (discussed in greater detail in the subsequent paragraphs). Thereafter, in one embodiment, the fibers are wetted with a B-stage elastomer binder and cured under heat and pressure.

Notwithstanding the method of manufacture, the structural overwrap 124 is configured to be relatively easily cut and stripped from the primary jacket 52 of the signal-carrying cable 4. Similar to the preparation of the signal-carrying cable 4 (illustrated in FIG. 5), the structurally augmented cable is cut to form a stepped transition between the first and second cable sections. The primary jacket 52 has a first jacket segment 54 which is rearward of the stepped transition, and the primary jacket 52 has a second jacket segment 55 which is forward of the stepped transition. In one embodiment, to facilitate stripping of the structural overwrap 124, a separating film or foil (not shown) may be disposed between the structural overwrap 124 and the primary jacket 52. Such film or foil serves to protect the primary jacket 52 when cutting away the structural overwrap 124. Furthermore, such a film or foil may facilitate separation and stripping the structural overwrap 124 from the primary jacket 52.

In one embodiment, the signal-carrying coaxial cable 4 includes all of the same components/elements as previously described in connection with FIGS. 3 through 6 of the drawings. More specifically, the signal-carrying coaxial cable 4 may include an inner conductor 44, an outer conductor 50, and a tubular insulator or insulating dielectric core 46 disposed therebetween. In the described embodiment, the foil layer 48 is disposed between the insulator or dielectric core 46, and the outer conductor 50. Further, the signal-carrying cable 4 includes a primary jacket 52 disposed over the outer conductor 50 to protect the inner and outer conductors 44, 50 from environmental factors such as wind, rain, humidity, sand, salt, etc.

In FIG. 9, the structurally-augmented jacket or structural overwrap 124, in one embodiment, includes a fiber-reinforced elastomer having a combination of off-axis and unidirectional fibers, e.g., +/−0/90/45 degree fibers to produce isotropic strength properties, i.e., equal strength in all directions. In the off-axis orientation, the fibers have a fiber orientation greater than or equal to at least about +/−thirty-five degrees (≥±35°) relative to the longitudinal axis 42 of the coaxial cable 4. This fiber orientation, in one embodiment, is suitable for applications below ground wherein a backhoe scoop or shovel may strike the cable assembly 120 at an angle or at a point along the circumference of the cable assembly 120. In one embodiment, the cable assembly 120 has equal properties strength in all directions to react the impact loads.

In another embodiment depicted in FIG. 10, the structurally-augmented jacket or structural overwrap 124 may comprise fibers 128 which are substantially parallel relative to the longitudinal axis 42 of the coaxial cable 4 to produce quasi-isotropic strength properties, i.e., nearly equal strength but greater strength in one direction than another. In the substantially parallel orientation, the fibers are less than or equal to about +/−ten degrees (≤±10°) relative to the longitudinal axis 42 of the coaxial cable 4. In this embodiment, the fiber orientation may be suitable for aerial or above-ground applications wherein loads along the length of the coaxial cable, e.g., in tension and bending, are substantially higher than off-axis loads, e.g., torsion loads.

In the embodiments described above, the reinforcing fibers 126, 128 may be relatively high strain (low modulus), high tensile strength, polyimide fibers such as C-glass S-glass, E-glass, Boron, or Kevlar fibers. Kevlar is a Registered Trademark® of Du Pont Nemours Inc., located in the Town of Wilmington, State of Delaware, USA. In this embodiment, the reinforcing fibers 126, 128 are relatively durable, i.e., toughened, to maximize the fatigue strength of the coaxial cable assembly 120. The chemical composition of Kevlar fiber is poly-para-phenylene-tereph-thalamide.

While, in one embodiment, the structurally-augmented jacket or structural overwrap 124 comprises a plurality of relatively high strain, low modulus fibers, in other embodiments, the overwrap 124 may include a plurality of relatively low strain, high modulus fiber such as carbon graphite or Boron fibers. Graphite and Boron fibers are electrically conductive and may be employed to enhance the electrical properties of the fiber material. Consequently, the overwrap 124 comprising, for example, graphite fibers may provide enhanced grounding and shielding characteristics by comparison to insulating materials such as E-glass or Kevlar fibers.

In another embodiment, the fibers 126, 128 of the structural overwrap 124 in combination with the conductive braid of the cable 4, produce a cable exterior which is flexible in a plane P normal to the longitudinal axis 42 of the coaxial cable 52. In one embodiment, the fibers of the structural overwrap 124 and outer conductor 50 produce a triaxially-braided cable with a "normal" innermost braided layer for signal transmission and an outermost fiber-reinforced layer to function as armor against abrasion and impact strikes. Furthermore, the triaxial braid can provide tensile strain relief over an unsupported span or length of cable.

In one embodiment, polyimide reinforcing fibers have a Modulus (E) of approximately $6.9 \times 10^5$ MPa to approximately $131 \times 10^5$ MPa with a percent elongation at failure ranging from approximately 2.8 to 5.6. The carbon and Boron fibers have a Modulus (E) of approximately $3.4 \times 10^5$ MPa to approximately $4.1 \times 10^5$ MPa. A suitable polyester or elastomer matrix has a Modulus of approximately $6.9 \times 10^5$ MPa and a tensile strength of approximately 28 MPa.

Notwithstanding the composition of the structural overwrap, e.g., the fiber orientation or binding matrix, the structurally augmented coaxial cable assembly 120 will generally employ a transition device 150 for adaptation to an interface port 14 shown in FIG. 2. That is, the transition device 150 facilitates the transition from the first cable section 130, i.e., the section which employs the structural overwrap 124, to the second section 140, the section which only includes the signal-carrying cable 4 without the structural overwrap 124.

The first cable section 130, having the structurally-augmented jacket or structural overwrap 124, is suitable to serve as an anchor for above-ground pathways. This is due to the axial load bearing enhancement integrated into the structural overwrap 124. Also, the first cable section 130 is suitable to guard, shield or otherwise protect the internal components of the cable 4 from strikes, punctures, cuts, and impact from objects penetrating into the ground. This is due to the puncture resistant characteristic or properties of the structural overwrap 124. Therefore, the first cable section 130 is configured for use in pathways, both under or aboveground, leading to the home or subscriber environment. The second cable section 140 will then be used in closer proximity to the subscriber environment, as well as within the subscriber environment, as previously described in FIGS. 1-8.

Figure 11:
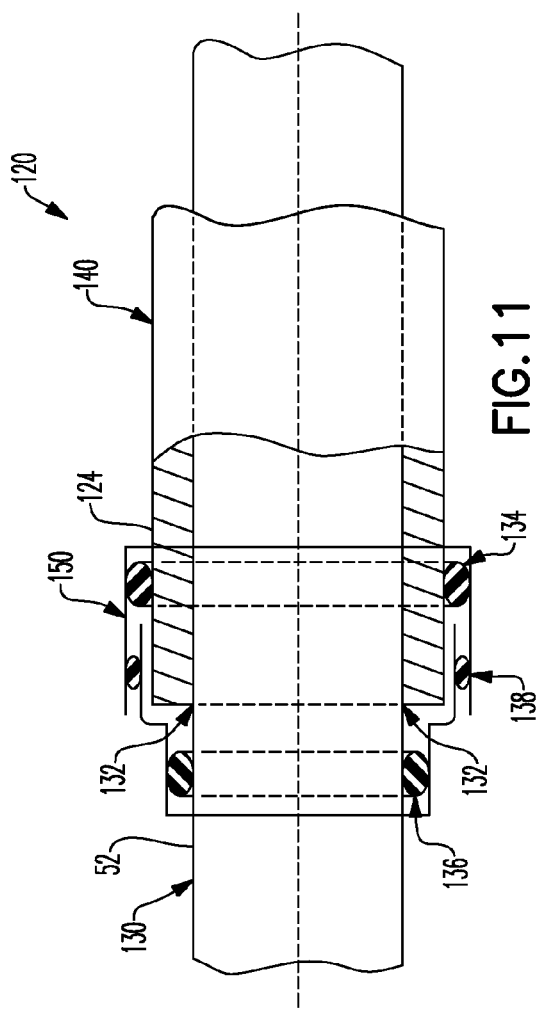
FIG. 11 is a schematic view of one embodiment of the structurally augmented coaxial cable assembly wherein a transition device produces first and second seals between the transition device and each of the respective first and second cable sections.

In one embodiment, depicted schematically in FIG. 11, the transition device 150 is disposed between the first and second cable sections 130, 140 and prevents water, moisture and/or other debris from infiltrating the mating interface 132 between the structural overwrap 124 and the signal-carrying coaxial cable 4. In this embodiment, suitable for applications below and above ground, the transition device 150 produces a first seal 134 between the first cable section 130 and a first end of the transition device 150. That is, the first seal 134 is produced between the structural overwrap 124 and an aft end of the transition device 150. Further, the transition device 150 produces a second seal 136 between the second cable section 140 and a second end of the transition device 150. The second seal 136 is produced between the elastomer jacket 52 of the signal-carrying cable 4 and the forward end of the transition device 150. Depending upon the configuration of the transition device 150, a third seal 138 may be produced between first and second portions or members 152, 154 of the transition device 150. The first, second and third seals 134, 136, 138 will be again discussed when describing the transition device 150 in greater detail.

Figure 12:
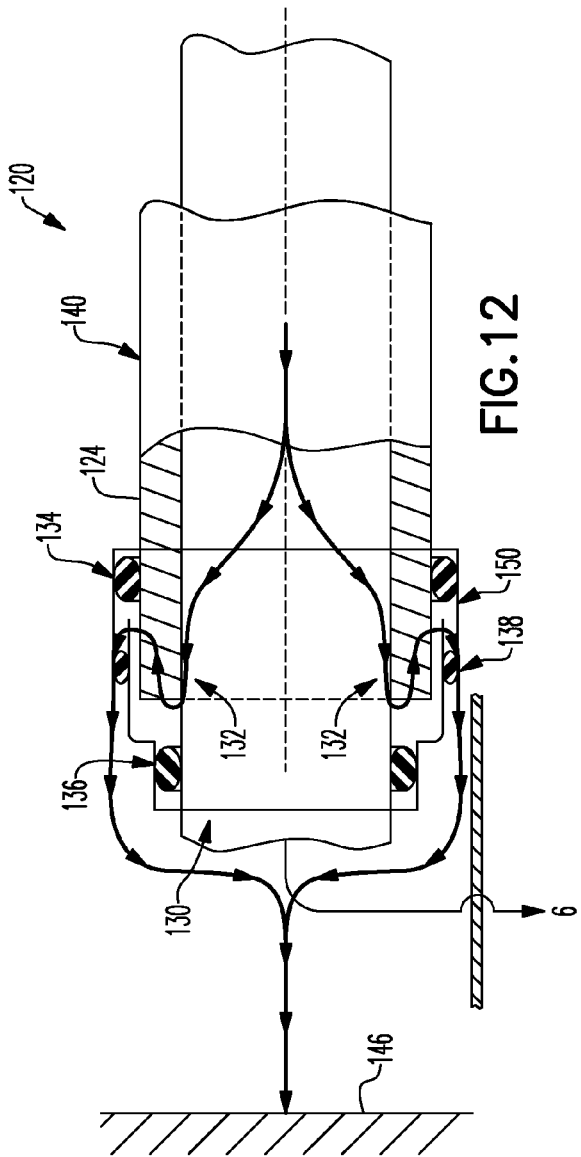
FIG. 12 is a schematic view of one embodiment of the structurally augmented coaxial cable assembly wherein the transition device produces a load path between the structural overwrap and an anchoring structure capable of carrying the weight of the structurally augmented coaxial cable.

In another embodiment, shown schematically in FIG. 12, the transition device 150 produces a structural load path from the second cable section 140 to an anchoring, standing structure or support structure 146 capable of carrying the weight of the structurally augmented cable assembly 120. In this embodiment, applicable to aerial applications, the transition device 150 produces a structural load path from the structural overwrap 124 to the anchoring/support structure 146. While this embodiment may also include seals 134, 136 between the transition device 150 and the respective cable sections 130, 140, one or both of the seals may be produced by other structures including a boot (not shown) between the transition device 150 and the support structure 146.

Figure 13:
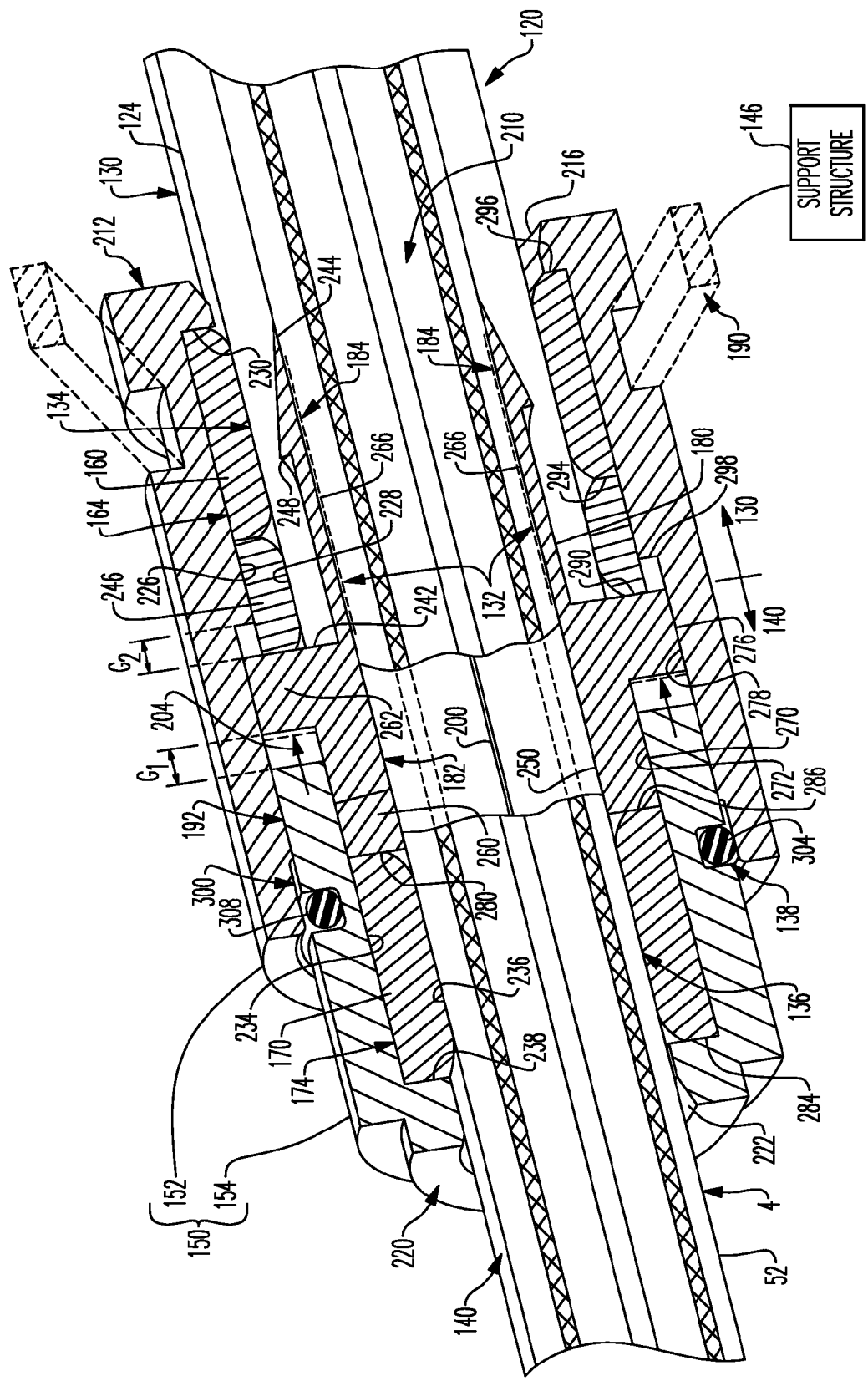
FIG. 13 is a broken away, sectioned view of one embodiment of the transition device including first and second coupling members which to radially deform first and second compression bands against the outer peripheral surface of the structurally augmented coaxial cable, wherein the transition device effects one or more seals to prevent infiltration of water and debris into the structurally augmented coaxial cable and to provide a path for the transfer of loads from the transition device to an anchor/support.

In FIG. 13, the transition device 150 comprises (i) first and second coupling members 152, 154, (ii) a first compression band 160 disposed within a first cavity 164 of the first coupling member 152, (iii) a second compression band 170 disposed within a second cavity 174 of the second coupling member 154, (iv) a support sleeve or post 180 having a load transfer end 182 and an annular barb 184, and (v) and a mount, coupler or an anchor 190, such as the illustrated anchoring strap 190, which couples at least one the coupling members 152, 154 to the support structure 146. The mount or anchor 190 carries the weight of the structurally augmented cable assembly 120 and transfers the loads of the cable assembly 120 to the support structure 146.

More specifically, in one embodiment, the first and second coupling members 152, 154 are connected along a coupling interface 192 to effect axial displacement of each of the coupling members 152, 154. In the described embodiment, the coupling interface 192 is a threaded interface, though any coupling method may be employed provided the coupling interface 192 effects axial displacement of at least one the coupling members 152, 154. In the described embodiment, each of the coupling members 152, 154 may include flat, planar surfaces (not shown) on opposite sides of the external periphery to facilitate the application of torque to each of the coupling members 152, 154. Relative rotation of the coupling members 152, 154 about a rotational axis 200 causes the coupling members 152, 154 to axially converge. In the described embodiment, the second coupling member 154 moves axially in the direction of arrow 204 toward the first coupling member 152.

Furthermore, the first and second coupling members 152, 154 define an opening 210 for receiving the first and second cable sections 130, 140 of the structurally augmented coaxial cable assembly 120. More specifically, the aft end 212 of the first coupling member 152 defines a first opening 216 for receiving the first cable section 130 of the coaxial cable 120. Additionally, the forward end 220 of the second coupling member 154 defines a second opening 222 for receiving the second cable section 140.

The first cavity 164 is an annular space defined by: (i) a cylindrical inner surface 226 of the first coupling member 152, (ii) the cylindrical outer surface of the structural overwrap 124 of the first cable section 130, and (iii) a forwardly-facing, ring-shaped abutment surface 230 defined by the aft end 212 of the first coupling member 152. Similarly, the second cavity 174 is an annular space defined by (i) a cylindrical inner surface 234 of the second coupling member 154, (ii) the cylindrical outer surface 236 of the primary jacket 52 of the second cable section 140, and (iii) a rearwardly-facing, ring-shaped abutment surface 238 defined by the forward end 220 of the second coupling member 154.

In described embodiment, each of the cavities 164, 174 is loaded with a respective one of the compression bands 160, 170. Depending upon the anticipated length of the tubular support sleeve or post 180, i.e., from a rearwardly-facing surface 242 of the load transfer end 182 of the post 180 to the tip 244 of the annular barb 184, a spacing ring 246 may also be loaded into an end of the first cavity 164 to radially align a barbed edge 248 of the post 180 with the center of the first compression band 160.

The tubular support sleeve or post 180 defines an opening 250 for receiving the signal-carrying conductor 4 and, more particularly, for receiving the second cable section 140. The post 180 slides along the primary jacket 52 of the signal-carrying conductor 4 until the tip 244 of the annular barb 184 engages, and is wedged between, the mating interface 132. Furthermore, the post 180 engages the matting interface 132 until the load transfer end 182 of the post 180 abuts an edge 202 of the structural overwrap 124.

In the illustrated embodiment, the load transfer end 182 of the post 180 is L-shaped and includes a first sleeve 260 and a flange 262 projecting radially from the sleeve 260. Furthermore, a second sleeve 266 is integrally formed with the first sleeve 260 and structurally connects the load transfer end 182 to the annular barb 184 of the post 180. Furthermore the second sleeve 266 is thin-walled relative to the first sleeve 260 and is coaxially aligned with the first sleeve 260 of the post 180. Finally, the annular barb 184 defines a knife-edge to facilitate engagement and insertion between the primary jacket 52 and structural overwrap 124, i.e., in the matting interface 132.

The first sleeve 260 of the post 180 defines an outwardly-facing cylindrical bearing surface 270 operative to engage an inwardly-facing cylindrical bearing surface 272 of the second coupling member 154. Further, the radial flange 262 of the post 180 defines an outwardly facing cylindrical bearing surface 276 operative to engage an inwardly-facing cylindrical bearing surface 278 of the first coupling member 152. The bearing surfaces 270, 272, 276, 278 facilitate rotational motion between the tubular support or post 180 and the first and second coupling members 152, 154. Moreover, the bearing surfaces 270, 272, 276, 278 center and support the first and second coupling members 152, 154 relative to the post 180 and, more particularly, relative to the first and second cable sections 130, 140 of the coaxial cable assembly 120.

Additionally, the first sleeve 260 of the post 180 defines a forwardly-facing abutment surface 280 opposing the rearwardly-facing, abutment surface 238 of the second coupling member 154. In the described embodiment, the abutment surfaces 238, 280 engage the side edges 284, 286 of the second compression band 170. Similarly, the radial flange 262 defines a rearwardly-facing abutment surface 290 opposing the forwardly-facing abutment surface 230 of the first coupling member 152. In the described embodiment, the rearwardly-facing abutment surface 290 engages a side edge 292 of the spacing ring 246, which, in turn, engages a side edge 294 of the first compression band 160. The forwardly facing abutment surface 230 of the aft end 212 of the first coupling member 152 engages the other side edge 296 of the first compression band 160. Consequently, the abutment surface 290 engages the first compression band 160 indirectly through the spacing ring 246.

Operationally, the structurally augmented coaxial cable assembly 120 is prepared by measuring the length of signal-carrying cable 4 required for use within the subscriber environment 6. Accordingly, the structural overwrap 124 is cut, stepped and stripped-away to expose a corresponding length of signal-carrying cable 4. Next, a transition device 150 of the type receives the cable assembly 120 through the opening 210. Initially the transition device 150 is at least partially disassembled. That is, the first and second coupling members are decoupled such that an installer may access and handle the post 180.

Initially the first coupling member 152 receives the first cable section 130 such that the first compression band 160 and spacing ring 246 are disposed between the coupling member 152 and the structural overwrap 124, i.e., in the first cavity 164. Similarly, the second coupling member 154 is disposed over the primary jacket 52 of the second cable section 140. The second compression band 170 is in position between the second coupling member 154 and the primary jacket 52. Furthermore, the second coupling member 154 is separated from the first coupling member 152 sufficient to handle and displace the post 180 relative to the structurally augmented cable assembly 120.

The tubular support or post 180 is insert between the structural overwrap 124 and the primary jacket 52 of the signal-carrying cable, i.e., within the mating interface 132. The post 180 is insert until the stepped edge 122 of the structural overwrap 124 engages the radial flange 262 of the post 180. It will be recalled that the length of the post 180 is predetermined to align the barbed edge 248 with the center of the first compression band 160.

The coupling members 152, 154 are brought together such that: (i) the aft end of the second coupling member 154 is disposed over the cylindrical bearing surface 270 of the first sleeve 260, (ii) the forward end of the first coupling member 152 is disposed over the cylindrical bearing surface 276 of the radial flange 262, (iii) the side edge 286 of the second compression band 170 is brought into contact with the abutment surface 280 of the first sleeve, (iv) the edge of the spacing ring 246 engages the abutment surface 290 of the radial flange 262 (it will be recalled that the opposite edge of the spacing ring 246 engages the first compression band 160), and (v) the forward end of the first coupling member 152 is disposed over the aft end of the second coupling member 154 such that the coupling members 152, 154 are properly joined along the threaded interface 192.

At this juncture, the first and second coupling members 152, 154 are separated by a small gap $G_1$. One of the first and second coupling members 152, 154 are rotated about the axis 200 to draw the coupling members 152, 154. More specifically, the coupling members 152, 154 are threaded together such that the second coupling member 154 draws closer to the first coupling member 152, closing the gap $G_1$. Furthermore, a second gap $G_2$ on the opposite side of the radial flange 262 closes such that the abutment surface 290 of the radial flange 262 engages a shoulder 298 disposed along the internal surface of the first coupling member 152.

Axial displacement of the coupling members 152, 154 effects radial deformation of first and second compression bands 160, 170 against the exposed outer surfaces of: (i) the structural overwrap 124 in the first cable section 130, and (ii) the primary jacket 52 of the signal-carrying conductor 4 in the second cable section 140. Radial deformation of the first compression band 160 effects a first seal 134 between the structural overwrap 124 and the first coupling member 152 of the transition device 150 in the first cable section 130. Radial deformation of the second compression band 170 effects a second seal 136 between the primary jacket 52 and the transition device 150 in the second cable section 140.

Furthermore, as the second coupling member 154 moves toward the first coupling member 152, a seal 138 forms along a sealing interface 300. In the described embodiment, a sealing ring 304 seats within an outwardly facing groove 308 in the second coupling member 154. Furthermore, the sealing interface 300 is disposed outboard of the threaded interface 192 between the first and second coupling members 152, 154.

Finally, radial deformation of the first compression band 160 against the structural overwrap 124 compresses the primary jacket 52 against the sleeve 182 and annular barb 184 of the post. It will be appreciated that coupling members 152, 154 and first compression band 160 are collectively a compression device for imposing radial loads while the support sleeve or post 180 reacts the radial loads.

Additionally, the radial loads imposed by the compression band 160 effect a frictional and mechanical interlock between the structural overwrap 124 and the transition device 150. Moreover, the radial loads generate friction forces between each of the mating interfaces within the transition member. In particular, friction loads are developed between the compression bands 160, 170 and the respective coupling members 152, 154. As such, tensile loads developed in the structural overwrap 124, i.e., as a result of carrying the weight of the structurally augmented cable assembly 120, are transferred to the first and section coupling members as a frictional shear load. This load is then transferred to the support structure 146 by an anchor 190 disposed about the external periphery of the transition member. Tensile loads transferred to the post 180 may also be transferred to the first coupling member 152 as the abutment surface 290 engages the shoulder 298 of the first coupling member 152. That is, tensile loads of post may be transferred as a compressive load from the flange 262 to the shoulder 298 of the first coupling member. Consequently, loads may be transferred as a frictional shear and compression load into the first coupling member 152 and out to the anchor/support structure 146

In the described embodiment, the compression band is fabricated from any thermoplastic elastomer (TPE), silicone rubber, or urethane. The properties of principle interest include durometer (for elastomers) the Poisson's ratio, bulk modulus, resilience, resistance to creep, and resistance to compression set. The length of the compression band, i.e., in the axial direction of respective coupling member 152, 154 can be equal to the length of the respective cavity or may include spacer, such as the spacing ring 246 in the first cavity 164.

In the previous embodiment, the transition device 150 transferred the weight of the coaxial cable assembly 120 principally as a frictional shear load through the mating interfaces of the transition device 150. In FIG. 14, another embodiment of the transition device 150 is disclosed wherein a post 320 transfers the load, i.e., the weight of the structurally augmented coaxial cable assembly 120, directly into the anchor/support structure 146.

In this embodiment, the support structure 146 includes an opening 148 for receiving the signal-carrying cable 4. The first cable section 130 of the structurally augmented cable assembly 120, extends into the subscriber environment 6, i.e., a home or office space. The second coaxial section 140, the portion of the structurally augmented cable assembly 120 which includes the structural overwrap 124, is received from the service provider, i.e., from a drop line cable 37, 39 (see FIG. 1) being diverted from a series of utility/telephone poles or underground pathways.

The post 320 includes a flange 324 coupled directly to the support structure 146 and an annular barb 326 connected by a thin-walled sleeve 330. The thin walled sleeve 330 and annular barb 326 projects outwardly from the support structure 146. While the sleeve 330 is substantially orthogonal to the flange 324, it will be appreciated that the sleeve 330 may define an angle with respect to the flange 324. Similar to the previous embodiments, the annular barb 326 includes a tip 334 which defines a knife-edge for insertion between the structural overwrap 124 and the primary jacket 52 of a signal-carrying cable 4. The post 320, therefore, interposes the structural overwrap 124 and underlying primary jacket 52 of the signal-carrying cable 4 such that an edge 338 of the structural overwrap 324 engages the flange 324.

The transition device 150 also includes a compression assembly 340 disposed over the structural overwrap 124 in the area corresponding to the post 320. The compression assembly includes (a) a hat-shaped compression coupling member or fitting 342 having: (i) an outwardly projecting brim or flange 344 coupled to the anchor/support structure 146, (ii) an inwardly projecting flange 348 disposed axially outboard of the annular barb 326 of the post 320, and (iii) a sleeve-shaped crown 352 connecting the outwardly and inwardly facing flanges 344, 348, (b) a compression band 336 disposed internally of the hat-shaped fitting 342 and abutting an abutment surface 360 of the inwardly projecting flange 348, and (c) a means, combined with the compression fitting 342, for deforming the compression band 336 radially inwardly against the structural overwrap 124 in the area corresponding to the annular barb 326 of the post 320.

The dimensions of the hat-shaped compression fitting 342 are predetermined such that when assembled in combination with the flange 344 of the post 320, i.e., fastened together with the anchor/support structure 146, the compression band 336 is displaced axially. Axial displacement of the compression band 336 deforms the band 336 radially to compress the structural overwrap 124. Consequently, the means for displacing the compression band 336 includes any structure or combination of elements which displaces the compression band 336 to deform the band against the structural overwrap 124.

In the illustrated embodiment, the structure for displacing the compression band 336 comprises a ring-shaped spacer 364 and a plurality of fasteners 366 operative to displace the hat-shaped compression fitting 342 axially. Axial displacement of the compression fitting 342 applies a compressive axial load P in the direction of arrows 370 to the edges of the compression band 336. The axial load P effects radial deformation of the band 336 into the structural overwrap 124 and against the annular barb 326 of the post 320. Accordingly, the overwrap 124 frictionally and interlockingly engages the post 320. Tensile loads of the structural overwrap transfer to the anchor/support structure 146 as a consequence of the radially loads imposed by the compression fitting 342.

A first seal 380 is formed between the compression band 336, the structural overwrap 124, and the compression fitting 342. A gasket 382 forms a second seal 384 located between the flange 324 of the post 320 and the support structure 146.

The above-described cable assembly 120 employs a common coaxial cable for use in both below-ground and above-ground applications. The cable assembly 120 employs a structurally augmented coaxial cable having a signal-carrying cable 4 and a structural overwrap 124, i.e., a fiber-reinforced, flexible matrix composite material, disposed over the primary jacket 52 of the signal-carrying cable 4. The structurally augmented cable assembly 120 includes first and second cable sections 130, 140 having a stepped transition therebetween. The stepped transition is formed by removing the structural overwrap 124 from the primary jacket 52 of the signal-carrying cable 4. The structural overwrap 124 may comprise a variety of reinforcing fibers 126, 128 disposed in a flexible binding matrix such as an elastomer or polyester matrix. The fibers 126, 128 may be selectively oriented to produce isotropic properties or quasi-isotropic strength properties in the structural overwrap 124.

Additionally, the structurally augmented cable assembly 120 may, in one embodiment, include a transition device 150 to seal the interfaces between the first and second cable sections 130, 140 and/or to transfer the loads of the cable, i.e., the weight of the drop-line cables 37, 39 spanning a utility/telephone pole to the support structure 146 in, or associated with, a subscriber environment 6. The transition member 150 includes a first and second coupling member 152, 154, each housing a pair of compression bands 160, 170 in a cavity formed therein. At least one of the compression bands 160 deforms radially inward to engage a cylindrical post 180. The post 180 reacts the radial loads to effect a frictional load path between the structural overwrap 124, the compression band 170, and the first coupling member 152 of the transition device 150. A strap 190 transfers the loads from the transition device 150 to the support structure 146 of a subscriber environment 6.

As mentioned above, the structurally augmented cable assembly 120 enables a single cable configuration to satisfy a variety of electrical and structural requirements. As such, a single coaxial cable may be employed to significantly reduce inventory requirements/costs.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A cable transition device comprising:

first and second coupling members configured to receive first and second cable sections of a structurally augmented cable, the first cable section including a structural overwrap disposed over a signal-carrying cable, the signal-carrying cable including an inner conductor, an outer conductor, a dielectric material therebetween and a compliant outer jacket, the first cable section defining a stepped transition and a mating interface between the structural overwrap and the compliant outer jacket of the signal-carrying cable, the second section comprising a portion of the signal-carrying cable extending beyond the stepped transition;

a support sleeve interposing the mating interface and including an annular barb at one end, a radially compliant flange at the other end and a sleeve configured to connect the annular barb and the radially compliant flange;

a first compression band disposed within a first cavity of the first coupling member; the first compression band disposed on one side of the stepped transition;

a second compression band disposed within a second cavity of the second coupling member; the second compression band disposed on the other side of the stepped transition; and an anchor configured to couple at least one the coupling members to a support structure, wherein the first compression band defines a first seal between the structural overwrap of the first cable section and the first coupling member, wherein the second compression band defines a second seal between the compliant outer jacket of the second cable section and the second coupling member, wherein the anchor is configured to produce a load path from the structural overwrap of the structurally augmented cable to the support structure, wherein the first and second coupling members are connected along a threaded interface and displaced axially to radially deform the first and second compression bands against the respective cable sections, the first and second compression bands producing an environmental seal to prevent infiltration of debris into the mating interface between the structural overwrap of the first cable section and the compliant outer jacket of the second cable section, and wherein the first compression band is configured to urge the annular barb into the structural overwrap to transfer the axial load carried by the structural overwrap into the radially compliant flange of the support sleeve, into the first coupling member and into the anchor.

2. A cable transition device comprising:

a support sleeve configured for insertion between an overwrap and a signal-carrying coaxial cable, the overwrap structurally augmenting the signal-carrying coaxial cable and defining a stepped transition at a terminal end of overwrap, the signal-carrying coaxial cable extending beyond the stepped transition;

a compression device configured to receive the cable, press the overwrap against at least a portion of the support sleeve, and establish an environmental seal at the stepped transition; and an anchor configured to provide a load path from the support sleeve to a support structure through the compression device.

3. The cable transition device of claim 2 wherein the support sleeve includes an annular barb at one end, wherein the compression device includes a coupling member having a cavity for receiving a compression band, the coupling member pressing the annular barb of the support sleeve into the overwrap to produce frictional load paths between (i) the overwrap and the compression band and (ii) between the coupling member and the compression band, such that axial loads are conveyed into the anchor by the coupling member.

4. The cable transition device of claim 3 wherein the coupling member includes an annular groove along an external surface thereof and wherein the anchor includes a strap engaging the annular groove and coupling to the support structure.

5. The cable transition device of claim 2 wherein the support sleeve includes an annular barb at one end, wherein the compression device includes a coupling member having a cavity for receiving a compression band, the coupling member pressing the annular barb of the support sleeve into the overwrap to produce a frictional and mechanical interlock therebetween, and wherein the anchor includes an outwardly projecting radial flange integrally formed at the other end of the support sleeve for mounting to the support structure.

6. The cable transition device of claim 5 wherein the coupling member includes an outwardly projecting radial flange abutting the outwardly projecting flange of the anchor, and wherein the radial flanges include aligned apertures for receiving a plurality of mounting fasteners.

7. The cable transition device of claim 2 wherein the compression device includes:

first and second coupling members receiving first and second cable sections disposed on each side of the stepped transition, each of the coupling members having an inwardly projecting flange defining an abutment surface disposed on opposite sides of the stepped transition, each inwardly projecting flange defining an annular cavity; and first and second compression bands disposed within each of the cavities of the first and second coupling members; and wherein axial displacement of the first and second coupling members effects radial compression of the first and second compression bands to effect an environmental seal around the first and second cable sections to prevent infiltration of debris between the overwrap and the signal-carrying coaxial cable.

8. The cable transition device of claim 2 wherein the compression device includes:

a coupling member having an inwardly projecting flange defining abutment surface at one end, and an outwardly facing flange at the other end, the coupling member defining an annular cavity; and a compression band disposed within the cavity of the coupling member; and wherein axial displacement of the coupling member effects radial compression of the compression band around the structural overwrap, the compression band producing a first seal along one side of the overwrap to prevent infiltration of debris between the overwrap and the signal-carrying coaxial cable.

9. The cable transition device of claim 8 wherein the anchor includes an outwardly projecting radial flange integrally formed at an inboard end of the support sleeve, wherein the coupling member includes an outwardly projecting radial flange abutting the outwardly projecting flange of the anchor, and further comprising a sealing gasket disposed between the flanges to provide a second seal along another side of the overwrap to prevent infiltration of debris between the overwrap and the signal-carrying coaxial cable.

10. The cable transition device of claim 7 wherein each of the first and second coupling members are joined along a threaded interface to effect axial displacement of the coupling members and radial displacement of the respective compression bands.

11. The cable transition device of claim 10 wherein each of the first and second compression bands defines a diameter dimension, and wherein the diameter dimension of the first compression band is larger than the second compression band.

12. A cable transition device comprising:

a support sleeve configured to be inserted between a structural overwrap and a compliant outer jacket of a coaxial cable, the compliant outer jacket surrounding signal-carrying conductors and extending beyond a terminal end of a stepped transition, and a compression device disposed over the stepped transition of the coaxial cable and configured to compress the structural overwrap over at least a portion of the support sleeve; and establish an environmental seal on each side of the stepped transition.

13. The cable transition device of claim 12 further comprising:

an anchor configured to provide a load path from the support sleeve to a support structure through one of the support sleeve and the compression device.

14. The cable transition device of claim 13 wherein the support sleeve includes an annular barb at one end, wherein the compression device includes a coupling member having a cavity for receiving a compression band, the coupling member pressing the annular barb of the support sleeve into the structural overwrap to produce frictional load paths between (i) the structural overwrap and the annular compression band and (ii) between the coupling member and the compression band, such that axial loads are conveyed into the anchor by the coupling member.

15. The cable transition device of claim 13 wherein the coupling member includes an annular groove along an external surface and wherein the anchor includes a strap engaging the annular groove and coupling to the support structure.

16. The cable transition device of claim 13 wherein the support sleeve includes an annular barb at one end, wherein the compression device includes a coupling member having a cavity for receiving a compression band, the coupling member pressing the annular barb of the support sleeve into the structural overwrap to produce a frictional and mechanical interlock therebetween, and wherein the anchor includes an outwardly projecting radial flange integrally formed at the other end of the support sleeve for mounting to the support structure.

17. The cable transition device of claim 16 wherein the coupling member includes an outwardly projecting radial flange abutting the outwardly projecting flange of the anchor, and wherein the radial flanges include aligned apertures for receiving a plurality of mounting fasteners.

18. The cable transition device of claim 13 wherein the compression device includes:
   first and second coupling members receiving first and second cable sections disposed on each side of the stepped transition, each of the coupling members having an inwardly projecting flange defining an abutment surface disposed on opposite sides of the stepped transition, each inwardly projecting flange defining an annular cavity; and
   first and second compression bands disposed within each of the cavities of the first and second coupling members,
   wherein axial displacement of the first and second coupling members effects radial compression of the first and second compression bands to effect an environmental seal around the first and second cable sections to prevent infiltration of debris between the structural overwrap and the compliant outer jacket.

19. The cable transition device of claim 13 wherein the compression device includes:
   a coupling member having an inwardly projecting flange defining abutment surface at one end, and an outwardly facing flange at the other end, the coupling member defining an annular cavity; and
   a compression band disposed within the cavity of the coupling member,
   wherein axial displacement of the coupling member effects radial compression of the compression band around the structural overwrap, the compression band producing a first seal along one side of the structural overwrap to prevent infiltration of debris between the structural overwrap and the compliant outer jacket.

20. The cable transition device of claim 19 wherein the anchor includes an outwardly projecting radial flange integrally formed at an inboard end of the support sleeve, wherein the coupling member includes an outwardly projecting radial flange abutting the outwardly projecting flange of the anchor, and further comprising a sealing gasket disposed between the flanges to provide a second seal along another side of the structural overwrap to prevent infiltration of debris between the structural overwrap and the compliant outer jacket.

21. The cable transition device of claim 18 wherein each of the first and second coupling members are joined along a threaded interface to effect axial displacement of the coupling members and radial displacement of the respective one of the first and second compression bands.

* * * * *